(12) United States Patent
Kang

(10) Patent No.: US 10,044,292 B2
(45) Date of Patent: Aug. 7, 2018

(54) METHOD FOR CONTROLLING INVERTER SYSTEM

(71) Applicant: LSIS CO., LTD., Gyeonggi-do (KR)

(72) Inventor: Ho-Hyun Kang, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/386,671

(22) Filed: Dec. 21, 2016

(65) Prior Publication Data

US 2017/0294851 A1  Oct. 12, 2017

(30) Foreign Application Priority Data

Apr. 8, 2016 (KR) .................. 10-2016-0043463

(51) Int. Cl.
  *H02M 7/493* (2007.01)
  *H02M 1/00* (2006.01)

(52) U.S. Cl.
  CPC .... *H02M 7/493* (2013.01); *H02M 2001/0048* (2013.01); *Y02B 70/1491* (2013.01)

(58) Field of Classification Search
  CPC ........... H02M 1/088; H02M 2001/007; H02M 3/285; H02M 7/153; H02M 7/17; H02M 7/49; H02M 7/493; H02M 3/1584; H02M 7/53806; H02M 7/5381
  USPC ...................................... 363/70–72
  See application file for complete search history.

(56) References Cited

U.S. PATENT DOCUMENTS

| 6,285,572 B1 | 9/2001 | Onizuka et al. | |
| 6,956,752 B2 * | 10/2005 | Miermans | H02M 1/36 363/65 |
| 2013/0201736 A1 * | 8/2013 | Chiang | H02J 3/383 363/71 |

FOREIGN PATENT DOCUMENTS

| JP | S61135366 A | 6/1986 |
| JP | 2000305633 A | 11/2000 |
| JP | 2000341959 A | 12/2000 |
| JP | 2002-165369 A | 6/2002 |
| JP | 2006187071 A | 7/2006 |
| JP | 3829317 B2 | 10/2006 |
| JP | 2010098862 A | 4/2010 |
| JP | 2013121211 A | 6/2013 |
| JP | 2015027210 A | 2/2015 |
| KR | 10-2013-0045748 A | 5/2013 |
| KR | 10-2013-0072543 A | 7/2013 |
| KR | 10-1369692 B1 | 3/2014 |
| KR | 10-2014-0143476 A | 12/2014 |
| KR | 10-2015 0029809 A | 3/2015 |

OTHER PUBLICATIONS

Japanese Office Action for related Japanese Application No. 2016-242651; action dated Feb. 27, 2018; (4 pages).

* cited by examiner

*Primary Examiner* — Nguyen Tran
(74) *Attorney, Agent, or Firm* — K&L Gates LLP

(57) ABSTRACT

The present invention relates to a method for controlling an inverter system including a plurality of inverters connected in parallel. The method includes: comparing a target power amount with an amount of power to be supplied by the predetermined number of inverters; determining the number of inverters to be driven, based on a result of the comparison; and supplying the final output power to an AC power system by driving inverters by the determined number of inverters.

4 Claims, 5 Drawing Sheets

PRIOR ART

PRIOR ART

METHOD FOR CONTROLLING INVERTER SYSTEM

CROSS REFERENCE TO RELATED APPLICATION

This application claims the benefit of Korean Patent Application No. 10-2016-0043463, filed on Apr. 8, 2016, entitled "METHOD FOR CONTROLLING OF INVERTER SYSTEM", which is hereby incorporated by reference in its entirety into this application.

BACKGROUND

1. Technical Field

The present invention relates to a method for controlling an inverter system, which is capable of operating an inverter system with high efficiency.

2. Description of the Related Art

In general, an inverter is a device which controls a motor with high energy efficiency by reducing power consumption of the motor. Specifically, the inverter can use a switching transistor to convert DC power into AC power.

A large capacity inverter is required to drive a large capacity motor. In order to manufacture a large capacity inverter, it is common that two or more unit inverters are connected in parallel to evenly distribute a current over the unit inverters to drive one large capacity motor.

FIG. 1 is a schematic view of a typical inverter system including a plurality of inverters arranged in parallel.

Referring to FIG. 1, the inverter system includes a DC current source 10, an inverter block 20 including N inverters #1, #2, . . . , #n arranged in parallel, and an AC power system 30.

In the inverter system, the N inverters #1, #2, . . . , #n connected to the DC current source 10 are responsible for their respective output powers Po_1, Po_2, . . . , Po_n by 1/N. The inverter system can supply rated output power by driving the N inverters having their respective power conversion ratios.

However, power loss may be caused due to the structural and operational characteristics of the inverters.

Specifically, an inverter power loss may include a conduction loss due to a conductor resistance component, a switching loss due to a switching operation of an internal power semiconductor, and a hysteresis loss due to an internal reactor for transformation and output filter, in operation of the inverters, the switching loss and the hysteresis loss have a constant value, while the conduction loss is proportional to output current or power.

FIG. 2 is a graph showing a power conversion efficiency of an inverter.

In FIG. 2, an X axis represents output power and a Y axis represents power efficiency. It can be seen from the graph that the power conversion efficiency of the inverter is defined by a ratio of power efficiency to output power and the maximum of the power conversion efficiency is limited to a range of 60 to 70%. That is, the power conversion efficiency of the inverter can be represented by a curve having the maximum efficiency point at 60 to 70%. This means that the conduction loss increases with increase in the output power, thereby limiting the power efficiency to a certain level.

In driving an inverter system, since all inverters connected in parallel are operated at once even in an interval where low power is required, the number of inverters driven with respect to power required is excessive, whereas the power efficiency is not so high. Therefore, the overall system operation efficiency is low.

For example, in the related art, all inverters are operated even when the maximum rated output power is not required. In this way, since all inverter are operated to supply a range of power which does not reach the maximum power, the system operation efficiency is lowered.

Accordingly, there is a keen need for a flexible inverter driving plan dependent on output power.

SUMMARY

It is an aspect of the present invention to provide a method for controlling an inverter system, which is capable of selectively driving inverters connected in parallel.

It is another aspect of the present invention to provide a method for controlling an inverter system, which is capable of flexibly driving inverters required for output power.

It is another aspect of the present invention to provide a method for controlling an inverter system, which is capable of preventing system operation efficiency from being lowered due to a system output load excessive with respect to output power.

It should be understood that the present invention is not limited to the above-mentioned aspects. The above and/or other aspects and advantages of the present invention will become apparent and more readily appreciated from the following description of the embodiments, taken in conjunction with the accompanying drawings. It should be understood that the objects and advantages of the present invention can be realized by features and combinations thereof set forth in the claims.

In accordance with one aspect of the present invention, there is provided a method for controlling an inverter system including a plurality of inverters connected in parallel, including: comparing a target power amount with an amount of power to be supplied by the predetermined number of inverters; determining the number of inverters to be driven, based on a result of the comparison; and supplying the final output power to an AC power system by driving inverters by the determined number of inverters.

In one embodiment, the act of comparing a target power amount with an amount of power to be supplied by the predetermined number of inverters may include comparing the target power amount with then amount of power to be supplied by the predetermined number of inverters while decrementing the predetermined number of inverters.

In one embodiment, the act of comparing a target power amount with an amount of power to be supplied by the predetermined number of inverters may include determining whether or not the amount of power to be supplied by the predetermined number of inverters meets the target power amount.

In one embodiment, the act of determining the number of inverters to be driven may include determining the predetermined number of inverters as the number of inverters to be driven if the amount of power to be supplied by the predetermined number of inverters is equal to or higher than the target power amount.

In one embodiment, each of the inverters connected in parallel may have an equal power conversion ratio so as to output the maximum rated power of the inverter system.

According to the aspects of the present invention, the inverter system has an advantage of selectively driving inverters connected in parallel.

In addition, the inverter system has another advantage of flexibly driving inverters required for output power.

In addition, the inverter system has another advantage of preventing system operation efficiency from being lowered due to a system output load excessive with respect to output power.

DETAILED DESCRIPTION

Figure 1:
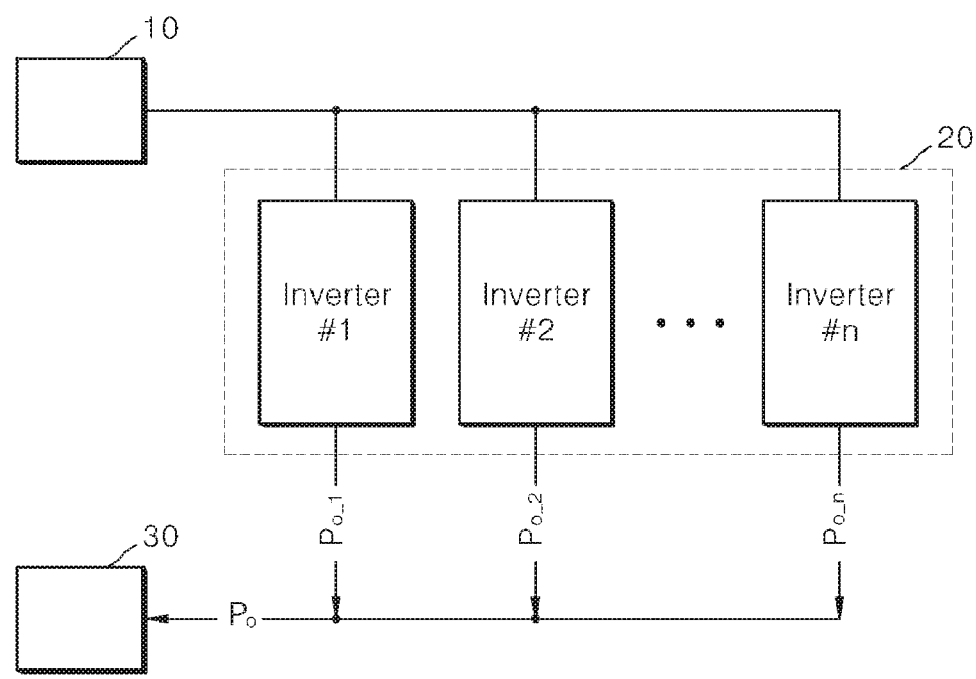
FIG. 1 is a schematic view of a typical inverter system including a plurality of inverters arranged in parallel.
Figure 2:
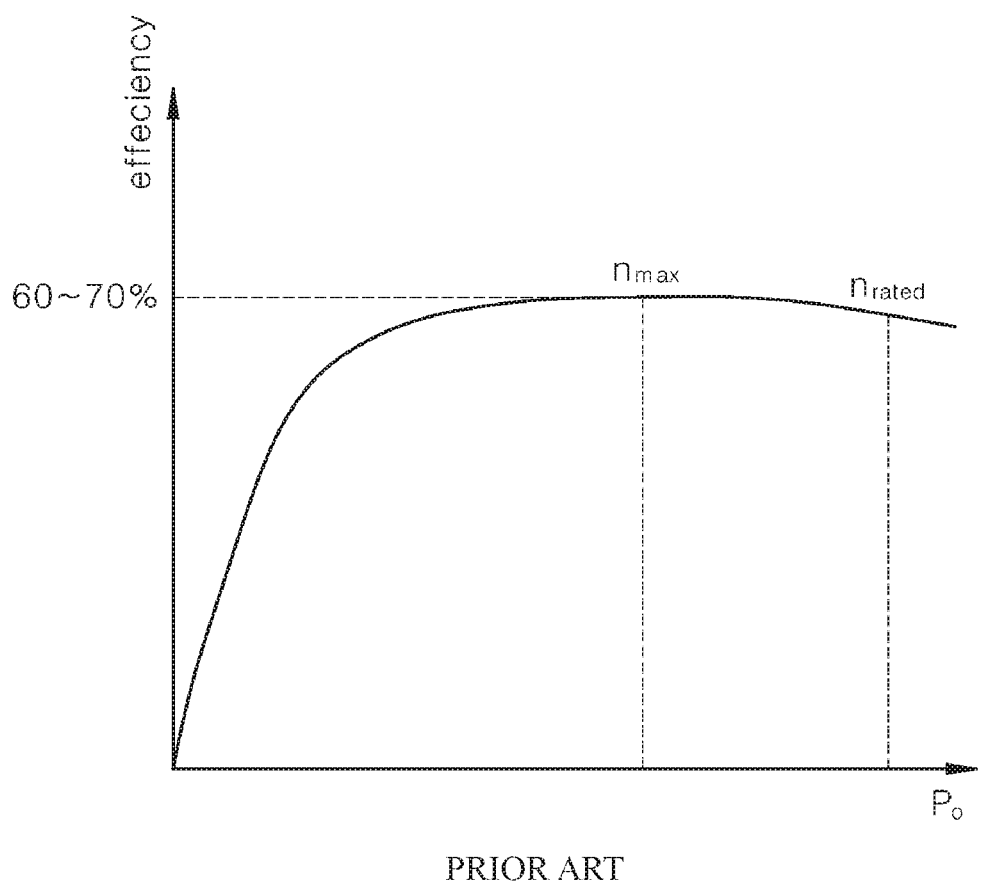
FIG. 2 is a graph showing a power conversion efficiency of an inverter.

The above objects, features and advantages will become more clearly apparent from the following detailed description in conjunction with the accompanying drawings. Therefore, the technical ideas of the present invention can be easily understood and practiced by those skilled in the art. In the following detailed description of the present invention, concrete description on related functions or constructions will be omitted if it is deemed that the functions and/or constructions may unnecessarily obscure the gist of the present invention. Hereinafter, preferred embodiments of the present invention will be described in detail with reference to the accompanying drawings. Throughout the drawings, the same or similar elements are denoted by the same reference numerals.

Figure 3:
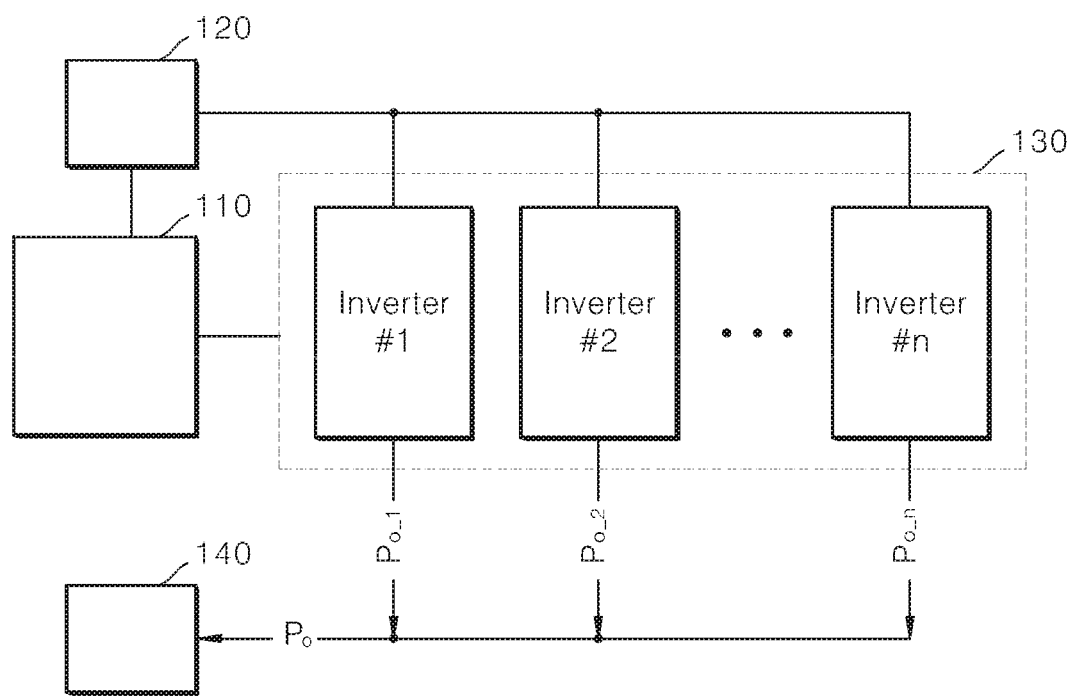
FIG. 3 is a schematic view of an inverter system according to one embodiment of the present invention.

FIG. 3 illustrates the configuration of an inverter system 100 according to one embodiment of the present invention.

Referring to FIG. 3, the inverter system 100 according to one embodiment of the present invention includes a power controller 110, a DC current source 120, an inverter block 130 and an AC power system 140.

The inverter system 100 according to one embodiment of the present invention instructs the amount of power required and determines the number of inverters to be driven in accordance with the amount of power required. Thus, it is possible to increase the system operation efficiency by appropriately selecting the number of inverters to be driven with respect to the target amount of power.

First, the power controller 110 is connected to the DC current source 120 and instructs the DC current source 120 to supply the amount of power required. In addition, the power controller 110 is connected to the inverter block 130, compares the amount of power required and the power conversion capacity of unit inverters and sets the number of unit inverters required. Then, the power controller 110 can select and drive only a predetermined number of inverters. For example, it can be determined whether to drive the predetermined number of selected inverters in a preset order.

The DC current source 120 is controlled by the power controller 110 so as to supply the target amount of power to the inverter block 130.

The inverter block 130 includes N unit inverters #1, #2, . . . , #n connected in parallel. The N inverters #1, #2, . . . , #n in the inverter block 130 are evenly responsible for their respective output power Po_1, Po_2, . . . , Po_n by 1/N of the overall system output power. Then, each of the N unit inverters #1, #2, . . . , #n can have a constant equal power conversion ratio. For example, assuming that the rated output power of the overall system is 1000 KW and the inverter block 130 includes 10 unit inverters, each of the 10 unit inverters has a power conversion ratio responsible for power of 100 KW.

The AC power system 140 is a power domain which can be operated with AC power. The AC power system 140 may include power devices and motors which are operated with AC power.

The operation of the inverter system 100 according to one embodiment of the present invention will now be described.

The power controller 110 provides the target amount of power to the DC current source 120. The power controller 110 determines the number of inverters required with respect to the target amount of power. This is to prevent the system operation efficiency from being lowered by driving all of the unit inverters with respect to the target amount of power and to select and drive a predetermined number of unit inverters in a flexible manner. In other words, all of the unit inverters are not always driven. According to some embodiment of the present invention, the inverter block 130 may include unit inverters to be driven and idle unit inverters.

Figure 4:
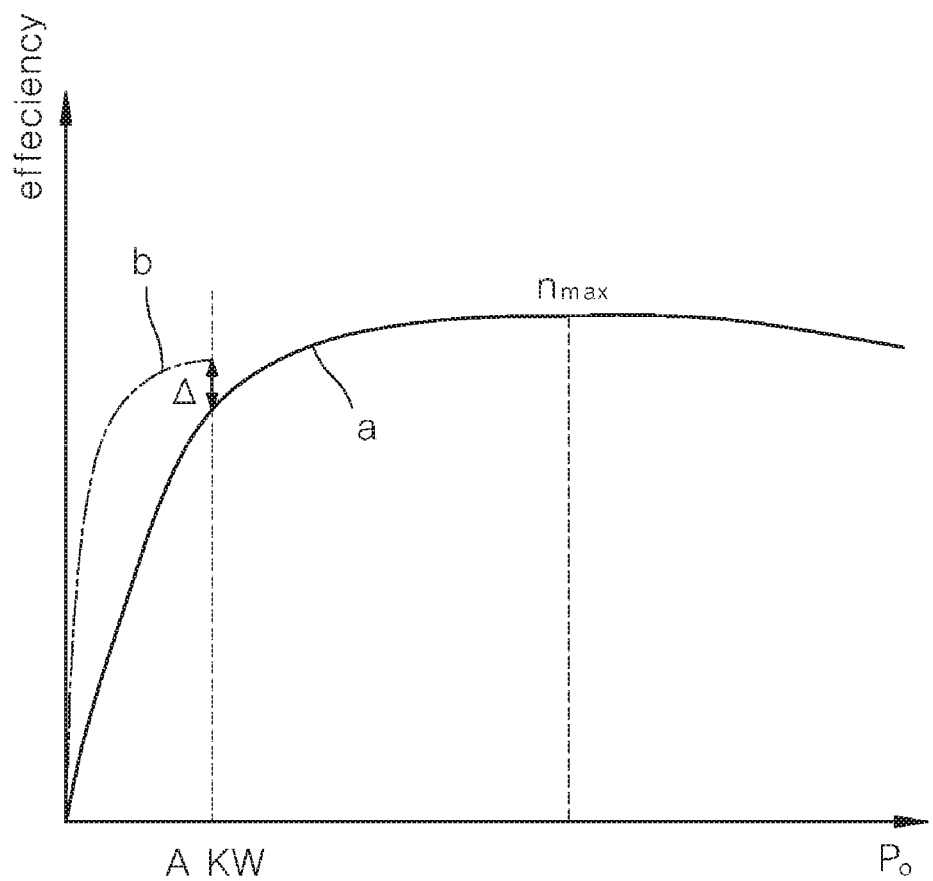
FIG. 4 is a graph showing a power conversion efficiency of an inverter according to one embodiment of the present invention in comparison with the prior art.

FIG. 4 is a graph showing a power conversion efficiency of an inverter according to one embodiment of the present invention in comparison with the prior art.

Referring to FIG. 4, an X axis represents output power and a Y axis represents power efficiency. It can be seen from the graph that the power conversion efficiency of the inverter is defined by a ratio of power efficiency to output power. As mentioned previously, the power conversion efficiency of the inverter can be represented by a curve having the maximum efficiency point at 60 to 70%. This means that the conduction loss increases with increase in the output power, thereby limiting the power efficiency to a certain level.

In the prior art, the overall system efficiency may be represented by the power conversion efficiency of a curve having the maximum efficiency point at 60 to 70% depending on the conduction loss of all inverters (see a curve a in FIG. 4).

In the prior art, even when all inverters are driven in a low output power interval, the power efficiency for outputting the target power is low due to the conduction loss for each inverter. For example, even when all inverters are driven in a power interval of 0 to A KW, since the number of inverters driven with respect to the amount of power required is excessive, the operation efficiency is low while the system load is excessive.

According to an embodiment of the present invention, in a power interval where an output load is remarkably small with respect to the overall rated power capacity, instead of driving all inverters, only the appropriate number of inverters which can reach the target capacity are driven (see a curve b in FIG. 4).

From comparison between the curve a and the curve b, it can be seen that it is more advantageous to drive the predetermined number of inverters suitable for output power than to drive all inverters in a power interval where a system power load is small. The graph of FIG. 4 shows that the power efficiency indicated by the graph b of the present invention is higher by a difference Δ than the power efficiency indicated by the graph a of the prior art.

According to an embodiment of the present invention, in consideration of power efficiency due to an inverter conduction loss, it is possible to appropriately select the number of unit inverters arranged in parallel and driven in the inverter system depending on the target amount of power. Thus, it is possible to achieve high efficiency of the system operation. There may be a need of a determination algorithm to determine the number of unit inverters to be driven depending on system output power.

Figure 5:
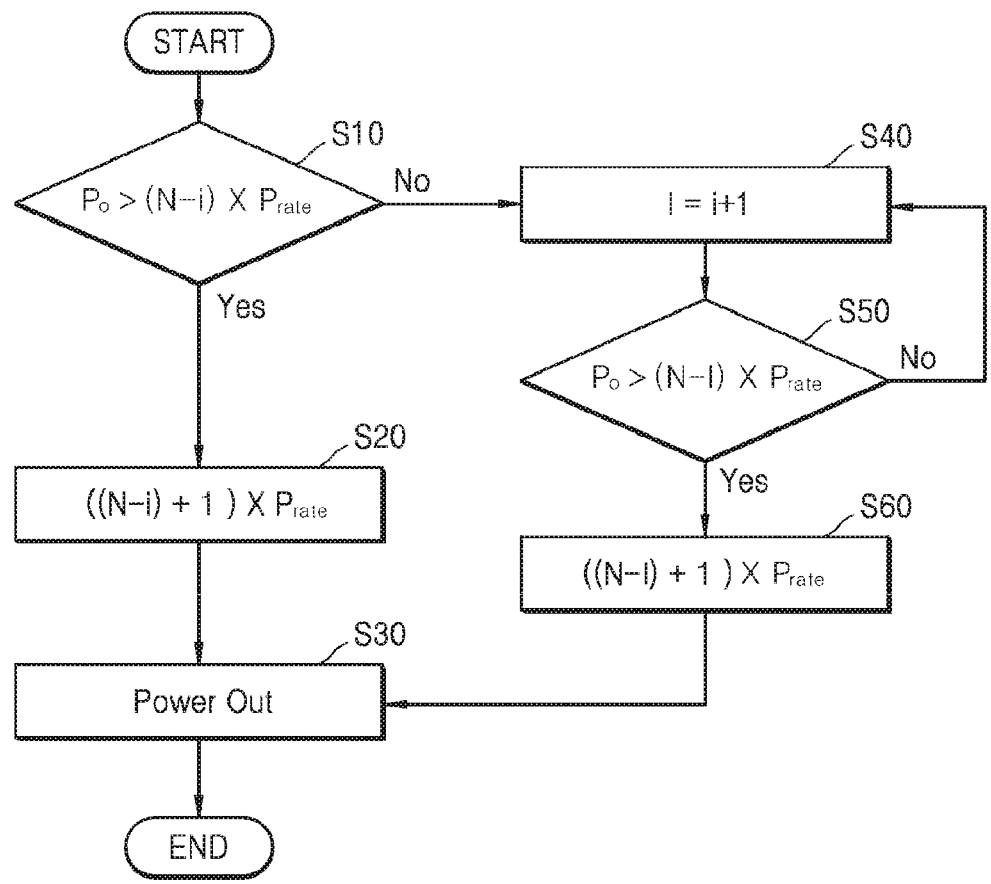
FIG. 5 is a flow chart showing a determination algorithm according to the operation of FIG. 3.

FIG. 5 is a flow chart showing a determination algorithm according to the operation of FIG. 3.

The operation of the inverter system according to an embodiment of the present invention will be described in detail below with reference to FIG. 5 in conjunction with FIG. 3.

For comparison between the target power amount Po and the amount of power which can be supplied by inverters, first, the target power amount Po is compared with the amount of power which can be supplied by inverters fewer by one than the total number N of inverters according to the following equation 1 (S10).

$$P_0 > (N-i) \times P_{rate}$$

where, Po is the target power amount, N is the total number of inverters, i is the natural number (1, 2, 3, . . . ), and $P_{rate}$ is 1/N of the overall rated capacity, i.e., an output conversion ratio of an unit inverter.

If the target power amount Po is higher than the amount of power which can be supplied by inverters fewer by one than the total number N of inverters (Yes in S10), this means that the target power amount Po is the maximum power amount of the inverter system, that is, all inverters are to be driven. The number of inverters to be driven may be determined based on a result of the comparison.

Accordingly, all unit inverters are driven to meet the target power amount Po (S20).

Then, the target power amount Po is provided, as the final output amount of power, to the AC power system 140 (S30).

On the other hand, if the target power amount Po is not higher than the amount of power which can be supplied by inverters fewer by one than the total number N of inverters (No in S10), a decreasing number is incremented by one according to the following equation 2 (S40).

$$I = i+1 \quad [\text{Eq. 2}]$$

where, I is a decreasing number and i is the natural number (1, 2, 3, . . . ).

When the decreasing number is incremented one by one, the number of inverters is accordingly decremented one by one in the later comparison operation.

Then, the target power amount Po is compared with the amount of power which can be supplied by the number of inverters decremented by one in step S40 according to the following equation 3 (S50).

$$P_0 > (N-1) \times P_{rate} \quad [\text{Eq. 3}]$$

As a result of the comparison, if the target power amount Po is higher than the amount of power which can be supplied by the number of inverters decremented by one (Yes in S50), inverters more by one than the current number of inverters are driven (S60).

In other words, this algorithm is to find the number of inverters decremented one by one when the amount of power supplied by them becomes lower than the target power amount Po. Since the number of inverters cannot meet the target power amount Po in step S50, inverters more by one than the current number of inverters are driven.

That is, the number of inverters to be driven is determined according to a result of the comparison. Thus, the final amount of output power can be supplied to the AC power system 140 (S30).

On the other hand, if the target power amount Po is lower than the amount of power which can be supplied by the number of inverters decremented by one (No in S50), the algorithm repeats the steps S40 and S50.

Through this repetition, the appropriate number of inverters to satisfy the target power amount Po is determined and driven. Then, the final amount of output power can be supplied to the AC power system 140 (S30).

As a specific example, assume that the target power amount Po is 700 KW, the rated output power of the overall system is 1000 KW, the total number of unit inverters is 10, and the amount of output power of each of the 10 unit inverters according to its output conversion ratio is 100 KW.

The target power amount Po is compared with the amount of power to be supplied by the number (9) of inverters fewer by one than the total number (10) of inverters (S10). Since the target power amount Po (700 KW) is not higher than the amount of power (900 KW) to be supplied by the number (9) of inverters fewer by one than the total number (10) of inverters (No in S10), the decreasing number is incremented by one (i.e., becomes 2 by I=i+1) (S40).

Then, the target power amount (700 KW) is compared with the amount of power (800 KW) to be supplied by the number (8) of inverters decremented by one (S50).

Since the amount of power (800 KW) to be supplied by the number (8) of inverters is still higher than the target power amount Po, the decreasing number is again incremented by one (i.e., becomes 3 by I=i+1) (S40) and the target power amount Po is compared with the amount of power to be supplied by the number (7 by N−1) of inverters (S50).

As a result of the comparison, since the target power amount Po (700 KW) is equal to the amount of power (700 KW) to be supplied by the current number (7) of inverters, the target power amount is not higher than the amount of power of the 7 inverters.

Accordingly, the decreasing number is again incremented by one (i.e., becomes 4 by I=i+1) (S40) and the target power amount Po is compared with the amount of power to be supplied by the number (6 by N−1) of inverters (S50).

As a result of the comparison, since the target power amount Po (700 KW) is higher than the amount of power (600 KW) to be supplied by the current number (6) of inverters, 7 inverters more by one than the current number (6) of inverters are driven (S60).

Accordingly, the 7 inverters can be driven to supply the final amount of output power to the AC power system 140 (S30).

As described above, according to an embodiment of the present invention, it is possible to compare the target power amount with the amount of output power of unit inverters and appropriately select the number of inverters to be driven with respect to the target power amount based on a result of the comparison. Thus, it is possible to drive inverters flexibly, thereby increasing the system operation efficiency.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A method for controlling an inverter system including a plurality of inverters connected in parallel, the method comprising:

determining a number of inverters to be driven, based on a result of a comparison between a target power amount and an amount of power to be supplied by a plurality of inverters, wherein the target power amount is compared with the amount of power to be supplied by a predetermined number of inverters while decrementing the predetermined number of inverters, wherein the plurality of inverters are evenly responsible for their respective output power by 1/N of the overall inverter system output power, wherein N is a total number of the plurality of inverters, and wherein the amount of power to be supplied by the predetermined number of inverters is the predetermined number times an amount of power output from any one of the plurality of inverters; and supplying a final output power to an AC power system by driving the inverter system by the determined number of inverters.

2. The method according to claim 1, wherein the comparison includes determining whether or not the amount of power to be supplied by the predetermined number of inverters meets the target power amount.

3. The method according to claim 1, wherein the act of determining the number of inverters to be driven includes determining the predetermined number of inverters as the number of inverters to be driven if the amount of power to be supplied by the predetermined number of inverters is equal to or higher than the target power amount.

4. The method according to claim 1, wherein each of the inverters connected in parallel has an equal power conversion ratio so as to output the maximum rated power of the inverter system.

* * * * *